United States Patent [19]
Knight

[11] Patent Number: 5,961,137
[45] Date of Patent: Oct. 5, 1999

[54] WHEEL RESTRAINT SAFETY SYSTEM

[76] Inventor: John Roland Knight, 45 Moore Pl., Barrie, Ont., Canada, L4N 6P1

[21] Appl. No.: 08/823,881

[22] Filed: Mar. 17, 1997

[51] Int. Cl.$^6$ ..................................................... B60R 19/00
[52] U.S. Cl. ........................................... 280/160; 280/770
[58] Field of Search ................................... 280/160, 161, 280/762, 768, 770; 293/58, 128

[56] References Cited

U.S. PATENT DOCUMENTS

| | | | |
|---|---|---|---|
| 1,347,937 | 7/1920 | Clary ........................................ | 280/770 |
| 2,002,823 | 5/1935 | Marvel et al. ........................... | 280/770 |
| 2,609,218 | 9/1952 | Van Antwerp ........................... | 280/770 |
| 3,829,117 | 8/1974 | Park ........................................ | 280/160 |

*Primary Examiner*—Robert J. Oberleitner
*Assistant Examiner*—Pamela J. Lipka
*Attorney, Agent, or Firm*—D. W. Eggins

[57] ABSTRACT

A loose wheel restraint safety system provides bolt-on support brackets in a system for attachment to the chassis or to the body of a vehicle, to which brackets wheel restraint bars are detachably mounted. The brackets of the system are located adjacent the wheels of the vehicle, such that the restraint bars, when mounted, are located in close proximity to the tires and extend horizontally across the wheel. The system elements, when bolted in place form, in combination with the adjoining vehicle bed or chassis portions, substantial wheel enclosures that permit each wheel and rim to turn freely upon its axle or spindle, while restraining the wheel against lateral deviation from its axle. The system is applied to each outer wheel of a multi-wheel rig, to restrain a break-away wheel against run-away, such that the driver, upon observing the situation, can pull the rig off the road and to a halt. The noise of such a containment occurring is anticipated to serve as adequate warning to the driver, to enable his early response. The brackets and restraint bars are robustly constructed of simple, high strength elements. The support brackets are sized to lie within the plan profile of the vehicle, such that local ordinances governing vehicle width are not infringed by the presence of the brackets. The restraint bars, when secured in place may exceed such ordinances. The restraint bars are readily removed when travelling through such jurisdictions, and to provide access to, and for servicing the tires and wheels.

3 Claims, 2 Drawing Sheets

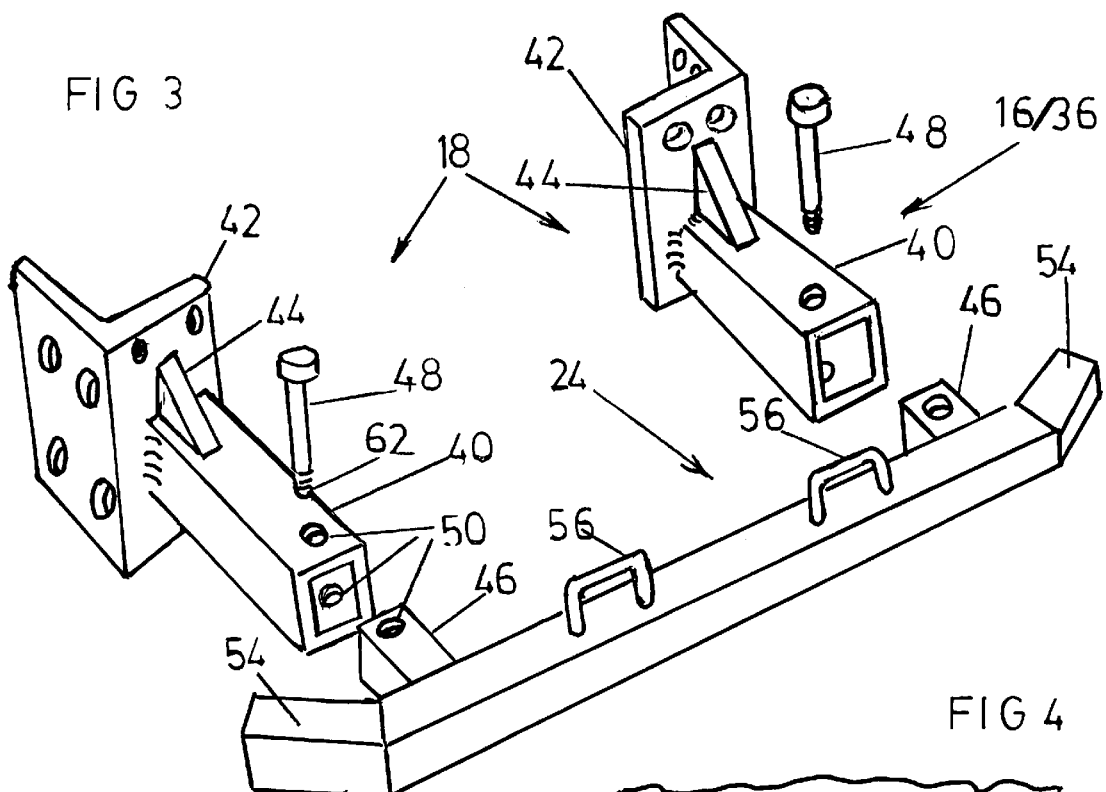
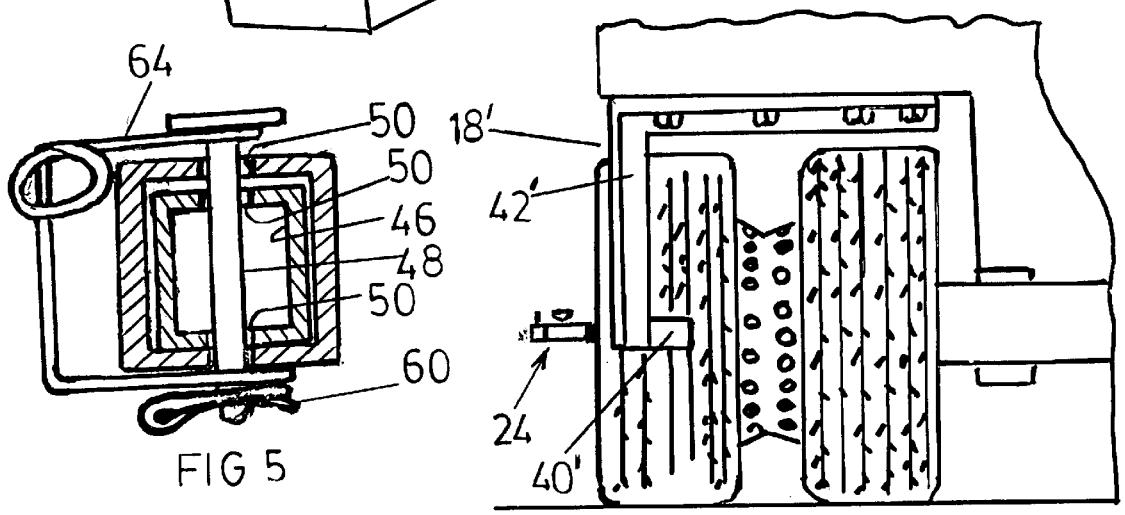

WHEEL RESTRAINT SAFETY SYSTEM

FIELD OF INVENTION

The present invention is directed to a wheel safety system for vehicles, and in particular to a wheel restraint system to maintain wheels of vehicles with their axles.

BACKGROUND TO THE INVENTION

Road haulage is playing an ever increasing role in North American transportation, with heavy reliance being placed upon large trucks and truck-trailers, used in long distance hauling. In some jurisdictions the vehicle weight and size limitations have been extended, presumably beyond the design limits of the existing vehicle components. As a consequence there have been a large number of wheel break-free occurrences, many of which have resulted in fatalities, with runaway wheels impacting other vehicles.

The approximate weight of 470 pounds (lbs) of a truck wheel and its tire, allied to typical highway speeds of, and sometimes well in excess of, 60 miles an hour (mph), i.e. 100 km/hr, result at wheel breakaway in an energy scenario both strange and deadly. It has been observed that frequently upon breakaway under these conditions the released wheel accelerates past the parent vehicle. Apparently due to its conditions of release, any tendency to bounce becomes exaggerated, such that succeeding bounces are excessively higher, so that bounces as high as fifty feet have been reported. Impact under such conditions is extremely destructive.

Without any such bouncing, collision with such an object at joining speeds usually in excess of 120 mph has proved to be almost invariably fatal.

Improved maintenance and safety checks do not appear to have the answer to this problem, which appears to be primarily the consequence of component overloading, particularly wheel bolts, and possibly axle components.

SUMMARY OF THE INVENTION

The present invention provides a loose wheel restraint safety system for use with a wheeled vehicle having a plurality of wheels rotatably mounted upon axle means attached to the vehicle, the system comprising first support brackets for attachment to the vehicle adjacent the wheels, wheel restraint bars detachably secured to the first brackets, in use to extend substantially horizontally, in close proximity to the tires of the wheels, the first brackets and the restraint bars, in association with adjoining portions of the vehicle providing wheel enclosures wherein the wheels are free to rotate in unrestricted fashion upon the axle means, and whereby, in use, upon the loosening of a wheel upon its axle means, the restraint bar restrains the wheel against substantial lateral deviation from its axle means. In the system each restraint bar is selectively removable to provide substantially unrestricted access to the respective wheel.

The system first support brackets are located within the plan profile of the vehicle, to avoid infringement of vehicle width restrictions.

The system restraint bars are secured to the first brackets by removable pin means.

The system restraint bars have carrying handle means, to facilitate their use, both on installation and removal. The carrying handles Nay also be used as supports by which to stow the restraint bars when not installed at the wheels. The system removable pin means preferably include pin locking means, to secure the pin means against accidental removal.

The pin locking means may include two individual resilient locking devices.

The system restraint bars have inwardly inclined fender portions at their ends, to safeguard the ends of the bars against impact. The system preferably includes auxiliary support bracket means for attachment to the vehicle, to receive the restraint bars in supported relation thereon when not installed upon the first support brackets.

In the preferred embodiment of the system each of the first bracket means includes tubular end portions, to receive tubular end portions of the restraint bar in mutually engaging relation therewith. Preferably, the restraint bar portion enters the bracket tube end portion.

The first bracket means tubular portions are of square section, having the restraint bar tubular end portions in inserted relation therein; the system includes locking pin means removably inserted across the inserted tubular portions, in mutual locking relation therewith.

BRIEF DESCRIPTION OF THE DRAWINGS

Certain embodiments of the invention are described by way of illustration, without limitation of the invention thereto other than as set forth in the following claims, reference being made to the accompanying drawings wherein:

FIG. 3 is a front perspective view from above of the bracket and restraint bar portions of FIG. 1, in disassembled relation;

FIG. 4 is a rear elevation of a vehicle incorporating an alternative support bracket embodiment, with the restraint bar shown prior to installment; and FIG. 5 is a section view of a support bracket portion having a portion of a restraint bar in inserted, pinned relation therewith.

DETAILED DESCRIPTION OF THE INVENTION

Figure 1:
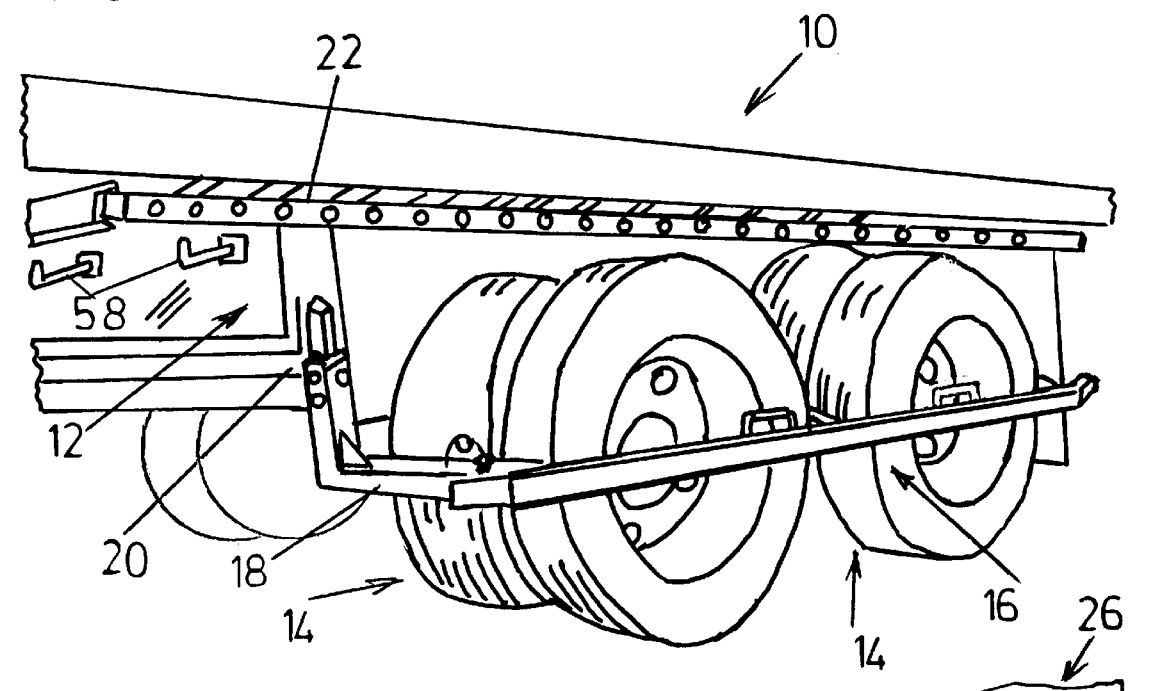
FIG. 1 is a perspetive sketch, in side elevation, of a portion of a vehicle having a wheel restraint system thereon in accordance with the present invention

Referring to FIG. 1, a portion 10 of a slider trailer is shown having a movable sub-chassis 12 equipped with dual wheels 14, arranged in tandem. A wheel restraint safety system 16, in accordance with the present invention has first support brackets 18, of L-shape in this instance, which are bolted to the sub-chassis 20 of the trailer. The sub-chassis 20 includes slider rails 22, with which the wheels 14 can be longitudinally relocated along the trailer 10 in accordance with loading requirements. The support brackets 18 and wheel restraint bar 24 move with the sub-chassis 20.

Figure 2:
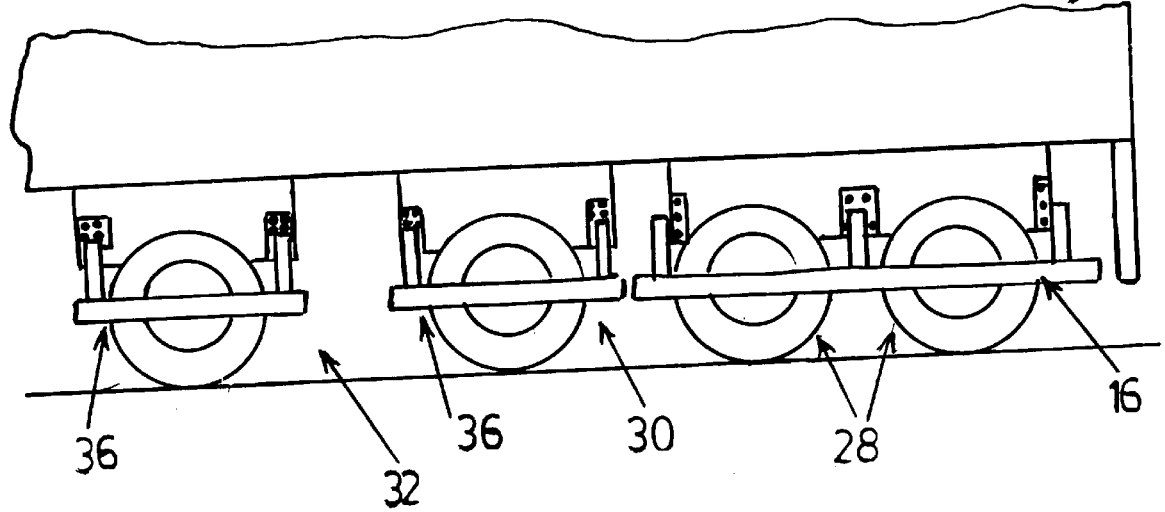
FIG. 2 is a side elevational view of another vehicle incorporating a similar system embodiment.

In the FIG. 2 embodiment, a vehicle such as a trailer or van 26 has a set of dual tandem wheels 28 at the rear of the vehicle 26, and two air-lift wheel sets 30, 32. Wheel restraint safety systems 16, 36, 36 enclose all of the wheels. In the case of air-lift wheel sets, 0, 32, these are free to be retracted when not in active road engagement, and to be returned within the respective restraint system 36 when deployed into use. Referring to FIG. 3, the elements of a wheel restraint safety system 16, 36 include first support brackets 18 and restraint bar 24. The brackets 18 have a hollow channel portion 40 of square section, welded to an angle iron base 42, and reinforced by a gusset plate 44. The bases 42 are bolted to the vehicle. The restraint bar 24 has support lugs 46 which engage the respective channel portions 40 of the brackets 18.

Drop pins 48 which are inserted through locking apertures 50, serve to lock the restraint bar 24 to the brackets 18. The restraint bar 24 has inwardly inclined end portions 54 which serve as deflector/guards.

Handle portions 56 are welded to the restraint bar 24, to facilitate handling thereof.

Pairs of auxiliary brackets 58, referred to below as second bracket means, are secured to the vehicle chassis at convenient locations, upon which the restraint bars 24 are hung by way of handle portions 56 when not in use.

In the case of the Dual Tandem wheel arrangement of FIG. 1 and 2, the restraint bar 24 includes an intermediate support lug 46, with its associated bracket 18.

Referring to FIG. 4, an alternative arrangement of bracket 18' comprises a hollow channel portion 40' welded to an inverted L-shaped base bracket 42'. The restraint bar 24 and drop-pin 48 securement provisions may be the same as for the FIG. 3 arrangement.

Referring to FIG. 5, the drop-pin 48 extends through the aligned apertures 50 of bracket 18 and of lugs 46 of restraint bar 24, in locking relation therewith. A spring-clip 60 engages an annular groove 62 (see FIG. 3) adjacent the end of drop-pin 48, to lock it in place. A second spring clip 64 is secured about the top end of drop-pin 48, having the lower end of spring clip 64 withdrawably engaging the lower end of drop-pin 48. The brackets 18 are located such that, in use, the restraint bar 24 is located at axle height, approximately half an inch from the tire wall. Upon failure of wheel attachments, the wheel in most instances is retained upon its axle, being restrained by the restraint bar 24 from moving sideways sufficiently far to fully disengage itself from its mountings. The ensuing noise is then usually sufficient to alert the driver to an untoward situation, so that he can slow his rig and pull off the highway. The fact that the failed wheel is not fully disengaged from its mountings enables a degree of energy transfer from the wheel to its mounting.

A further advantage of the present invention is that, in the event that a wheel is improperly installed, such that it is cranked out of alignment (which is not unknown to happen) the mis-alignment will in most instances result in rubbing or impacting of the tire against the restraint bar 24, thus serving audible notice of the condition to the driver before he gains full speed.

While it is preferable that the loose wheel restraint safety system be fully deployed at al times, under present day conditions most heavy haulage vehicles are already at the maximum legal width limit, such that the addition of the restraint bars 24 then exceeds the legal width limit.

In many jurisdictions this may be overcome by obtaining an annual "Overwidth" permit, thereby enabling full-time use of the system. For jurisdictions where such permit provisions do not exist, the bars 24 are readily and rapidly removable, with convenient stowage therefor provided to-hand by way of the second bracket means.

It will be particularly noted that the first brackets 18 do not extend beyond the tires of the vehicle, and lie within the plan profile envelope of the vehicle, such that removal of the bars 24 then returns the vehicle to its pre-existing width condition.

COMMERCIAL UTILIZATION

Widespread need for the present invention currently exists in Canada, where heavier permitted gross loadings contribute to wheel failures; and elsewhere, such as the United States, this safety system should find wide utilization.

What I claim by Letters Patent of the United States is:

1. A loose wheel restraint safety system in combination with a wheeled vehicle having a plurality of wheels rotatable mounted upon axle means attached to the vehicle, said system comprising first support brackets attached to the vehicle within the plan profile of the vehicle and adjacent said wheels, wheel restraint bars having carrying handle means, said restraint bars being detachably secured by removable pin means to the first brackets, in use to extend substantially horizontally, in close proximity to the tires of the wheel, said first brackets and said restraint bars, in association with adjoining portions of said vehicle providing wheel enclosures wherein said wheels are free to rotate in unrestricted fashion upon said axle means, and whereby, in use, upon the loosening of a wheel upon a said axle means, the respective adjacent one of said restraint bars restrains said wheel against substantial lateral deviation from said axle means, said restraint bars having inwardly inclined fender portions at their ends, to safeguard the ends of said bars against impact.

2. A loose wheel restraint safety system in combination with a wheeled vehicle having a plurality of wheels rotatably mounted upon axle means attached to the vehicle, said system comprising first support brackets attached to the vehicle within the plan profile of the vehicle, and adjacent said wheels, wheel restraint bars having carrying handle means, said restraint bars being detachably secured by removable pin means to the first brackets, in use to extend substantially horizontally, in close proximity to the tires of the wheel, said first brackets and said restraint bars, in association with adjoining portions of said vehicle providing wheel enclosures wherein said wheels are free to rotate in unrestricted fashion upon said axle means, and whereby, in use, upon the loosening of a wheel upon a said axle means, the respective adjacent one of said restraint bars restrains said wheel against substantial lateral deviation from said axle means, each of said first bracket means including tubular end portions receiving tubular end portions of said restraint bar in mutually engaging relation therewith.

3. The combination as set forth in claim 2, wherein said first bracket means tubular portions are of square section, having said restraint bar tubular end portions in inserted relation therein; said system including locking pin means removably inserted across said tubular portions, in mutual locking relation therewith.

* * * * *